US008223491B2

(12) United States Patent
Yang (10) Patent No.: US 8,223,491 B2
(45) Date of Patent: Jul. 17, 2012

(54) FASTENER FOR SECURING COMPUTER STORAGE DEVICE

(75) Inventor: Fu-Jen Yang, Taipei Hsien (TW)

(73) Assignee: Wistron Corporation, Taipei Hsien (TW)

( * ) Notice: Subject to any disclaimer, the term of this patent is extended or adjusted under 35 U.S.C. 154(b) by 150 days.

(21) Appl. No.: 12/832,467

(22) Filed: Jul. 8, 2010

(65) Prior Publication Data

US 2011/0110034 A1    May 12, 2011

(30) Foreign Application Priority Data

Nov. 9, 2009 (TW) ................................ 98137895 A (51) Int. Cl.
*G06F 1/16* (2006.01)
(52) U.S. Cl. ................ 361/679.58; 360/97.19; 345/650; 710/62
(58) Field of Classification Search .................. 360/137, 360/69, 98.08, 92.1, 97.19; 361/679.33, 361/679.32, 679.4, 679.39, 679.55, 679.21, 361/679.31, 679.43, 679.57, 679.34; 345/684, 345/173, 419, 650; 710/11, 58, 8, 74, 62; 248/201, 220.21, 220.31; 455/41.2, 575.4, 455/422.1, 575.3, 575.1
See application file for complete search history.

(56) References Cited

U.S. PATENT DOCUMENTS

| | | | |
|---|---|---|---|
| 6,392,884 B1 * | 5/2002 | Chou | 361/679.33 |
| 7,242,554 B1 * | 7/2007 | Lin | 360/137 |
| 7,256,989 B2 * | 8/2007 | Liu et al. | 361/679.33 |
| 2007/0035920 A1 | 2/2007 | Peng et al. | |
| 2008/0298005 A1 | 12/2008 | Deng et al. | |

FOREIGN PATENT DOCUMENTS

| | | |
|---|---|---|
| CN | 2842534 Y | 11/2006 |
| CN | 101315574 A | 12/2008 |

OTHER PUBLICATIONS

Communication from a foreign patent office in a counterpart foreign application dated Mar. 20, 2012.

* cited by examiner

*Primary Examiner* — Hung Duong
(74) *Attorney, Agent, or Firm* — Rosenberg, Klein & Lee (57) ABSTRACT

A fastener for securing computer storage devices is revealed. The fastener is arranged at a storage device of computers. The fastener for securing computer storage devices consists of a first fix member, a second fix member and a connection part. The first fix member and the second fix member respectively are disposed on two sides of the storage device. The first fix member as well as the second fix member respectively has at least one first groove and at least one second groove. A first mount member and a second mount member of a housing respectively are mounted into the first groove and the second groove. The storage device is fixed by the first fix member and the second fix member. The storage device is mounted in the housing of computers more stably by the assembling of the first mount member and the second mount member with the first groove and the second groove respectively.

22 Claims, 9 Drawing Sheets

FASTENER FOR SECURING COMPUTER STORAGE DEVICE

BACKGROUND OF THE INVENTION

1. Fields of the Invention

The present invention relates to a fastener, especially to a fastener for securing computer storage devices.

2. Descriptions of Related Art

Computer hardware consists of a plurality of components such as a motherboard, various interface cards, a plurality of storage devices, and so on. The storage devices include floppy disks, hard disks, optical disk drives and magnetic disk drives. All components are disposed inside a computer housing. Because the storage device is an optional component, the computer housing is disposed with frames for mounting the storage devices in advance for convenience of expansion and disassembly of the storage devices.

For fastening the storage device, now fastening elements such as screws are used to install the storage device on the frame inside the computer housing firmly. But the fastening way has some shortcomings. For examples, while assembling these storage devices, users need to use tools to set and unscrew the fastening elements. Once the storage devices are required to be disassembled and there is no tool available, the storage devices are unable to be assembled or disassembled. This is inconvenient for users. Moreover, the assembly of the storage devices requires a plurality of fastening elements so that the fastening process is tedious and time-consuming. And the small fastening elements are easy to lose and this is inconvenient to a certain extent. Once the fastening element is falling onto the mother without being found, this will lead to a short circuit that causes great damages to the motherboard.

Moreover, the fastening element is not an elastic element. Thus the computer hosing vibrates when external forces are imposed after the storage device being secured in the housing by the fastening element. Or the vibration caused by operation of the storage device is transmitted to the housing by the fastening element. Yet computer software including different functions and information are stored in the storage device. Once vibrations are generated during operation of the storage device increases the probability of data loss. Thus the safety and stability are basic requirements for the storage devices.

Furthermore, some storage devices have screwless quick release design. A holder made from plastic is used as a part of assembling or disassembling members of the storage devices. By elasticity of plastic and part of vibration absorbing material used, the vibration absorption effect is enhanced. Although the above quick release design allows users to disassemble the storage device conveniently, the holder with complicated structure increases manufacturing cost of computer housings. And the installation of the storage device with the holder is quite complicated. Thus the fastening of the storage device by the holder is inconvenient to users.

In addition, although some fasteners of storage devices require no fastening elements, they need to be fastened on the storage device firstly for being secured in the housing. These fasteners are unable to be secured independently in the housing. When not in use, the fasteners are placed somewhere else and this also causes inconvenience.

Thus there is a need to provide a novel fastener for securing computer storage devices that improves convenience of assembly/disassembly of the storage devices and reduces damages caused by vibrations generated during operation of the storage devices so as to overcome above shortcomings.

SUMMARY OF THE INVENTION

Therefore it is a primary object of the present invention to provide a fastener for securing computer storage devices that fixes a storage device by a first fix member and a second fix member. Moreover, the storage device is fixed more stably in a housing of computers by a first mount member and a second mount member of the housing respectively assembled with at least one first groove of the first fix member and at least one second groove of the second fix member. Thus the assembling or disassembling of the storage device becomes more convenient.

It is another object of the present invention to provide a fastener for securing computer storage devices in which a connection is used to connect the first fix member with the second fix member. The movement of the first fix member as well as the second fix member becomes more convenient due to the connection part. Thus the convenience of assembly or disassembly of the storage device is enhanced.

It is a further object of the present invention to provide a fastener for securing computer storage devices in which the first fix member as well as the second fix member is disposed with a plurality of fix pins and the storage device is arranged with a plurality of fix holes. By the fix pins mounted in the fix holes, the storage device is assembled with the first fix member as well as the second fix member more conveniently.

It is a further object of the present invention to provide a fastener for securing computer storage devices in which at least one buffer element arranged between the fix pin and the first fix member as well as the fix pin and the second fix member. By the buffer element, damages of the storage device caused by vibration are reduced and life span of the storage device is further extended.

In order to achieve above objects, a fastener for securing computer storage devices is disposed on a storage device of computers. The fastener is arranged at least one slot of a housing of computers. The fastener for securing computer storage devices includes at least a first fix member, a second fix member and a connection part. The first fix member is disposed one on one side of the storage device as well as on one side of a slot. The first fix member is arranged with at least a first groove while a first mount member is disposed on one side of the slot. The first mount member is assembled with the first groove. The second fix member is disposed on the other side of the storage device as well as on the other side of the slot. The second fix member is arranged with at least a second groove while a second mount member is disposed on the other side of the slot. The second mount member is assembled with the second groove. A storage device is fixed by the first fix member and the second fix member. Moreover, by the assembling of the first mount member and the second mount member with the first groove and the second groove respectively, the storage device is mounted in the housing of computers more stably. Thus the assembling/disassembling of the storage device becomes more convenient.

Furthermore, by the first fix member and the second fix member are connected by the connection part so that the movement of the first fix member as well as the second fix member is more convenient. And the convenience of both assembly/disassembly of the storage device is enhanced.

In addition, the first fix member as well as the second fix member is disposed with a plurality of fix pins and the storage device is arranged with a plurality of fix holes correspondingly. The fix pin is mounted in the fix hole. By the fix pine, the storage device is assembled with the first fix member as well as the second fix member more conveniently. A buffer element is also positioned between the first fix member and each fix pin as well as the second fix member and each fix pin. The damages of the storage device caused by vibration can be reduced by the buffer elements so that the life span of the storage device is extended.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Refer from FIG. 1A to FIG. 2C, a perspective view and schematic drawings showing an embodiment of a fastener for securing computer storage devices according to the present invention are revealed.

As shown in figures, a fastener for securing computer storage devices according to the present invention is arranged at a storage device 10 of computers that is a magnetic disk drive or an optical disk drive. The fastener of the computer storage device 10 is disposed on at least a slot 22 of a computer housing 20 and is having a first fix member 30 and a second fix member 40. The first fix member and the second fix member 40 respectively are arranged at two sides of the storage device 10 as well as two inner sides of the slot 22. The first fix member 30 is disposed with at least one first groove 32 and the second fix member 40 is arranged with at least one second groove 42 while a first mount member 222 and a second mount member 224 are respectively disposed on two sides of the slot 22 correspondingly. The first mount member 222 and the second mount member 224 are respectively assembled with the first groove 32 and the second groove 42. The first mount member 222 and the second mount member 224 can be integrated with the housing 20 so that the storage device 10 is mounted into the computer housing 20 more stably by the first mount member 222 and the second mount member 224.

The first fix member 30 as well as the second fix member 40 is disposed with a plurality of fix pins 50 while the storage device 10 is arranged with a plurality of fix holes (not shown in figure) correspondingly. The storage device 10 is assembled with the first fix member and the second fix member 40 easily and conveniently by the fix pin 50 mounted in the fix hole (not shown in figure). Once a user intends to mount the storage device 10 into the housing 20, the fix pin 50 is aligned with the fix hole of the storage device 10 so that the first fix member 30 and the second fix member 40 are respectively located on two sides of the storage device 10. The first groove 32 and the second groove 42 respectively are aligned with the first mount member 222 and the second mount member 224. Then the first fix member and the second fix member 40, together with the storage device 10 are pushed into the housing. The storage device 10 is fixed by the first fix member and the second fix member 40 and is mounted in the housing more firmly by the first mount member 222 and the second mount member 224 assembled with the first groove 32 and the second groove 42 respectively. Thus the assembling or disassembling of the storage device 10 becomes more convenient.

Moreover, the fix member 30 and the second fix member 40 are respectively disposed with a plurality of buffer elements 60 that is made of rubber. The buffer element 60 is positioned between the first fix member 30 and the fix pin 50. The buffer element 60 is also situated between the second fix member 40 and the fix pin 50. The buffer element 60 is used to reduce damages of the storage device 10 caused by vibration and further extend life span of the storage device 10. The first fix member 30 and the second fix member 40 respectively are further arranged with a plurality of holes 34, 44 and the buffer element 60 is introduced in each hole 34, 44. Thus the vibration of the storage device 10 is lessened.

Furthermore, at least one first locking member 36 is disposed on a side of the first fix member 30 of the present invention and at least one first stopper 226 is arranged at the housing 20. The first stopper 226 is located on one side of the slot 22. When the user intends to mount the storage device 10 into the housing 20, the first fix member as well as the second fix member 40 is mounted in the slot 22 and the first locking member 36 contacts with a front side of the first stopper 226 so that the fix member 30 is stopped. Then the first locking member 36 is pressed down so as to make the first locking member slide the slot 22 smoothly. Later the first stopper 226 presses against the first locking member 36. Thus the storage device is mounted inside the housing 20. The first stopper 226 is a metal sheet installed on one side of the slot 22. The first stopper 226 can be integrated with the housing during manufacturing. In order to increase strength of the slot 22 for preventing deformation of the slot 22 caused by gravity or external forces, at least one first reinforcement member 228 is arranged at the housing 20 and is located on one side of the slot 22. The structural strength between the two adjacent slots 22 is improved by the first reinforcement member 228. The reinforcement member 228 can also be integrated with the housing 20 so that the manufacturing of the housing 20 is more convenient.

In addition, one side of the second fix member 40 can also be disposed with at least one second locking member and the housing is arranged with at least one second stopper that is located on the other side of the slot 22. The locking member leans against the stopper. The second stopper is integrated with the housing 20. And the housing 20 is arranged with at least one second reinforcement member. The disposition way of the second locking member, the second stopper and the second reinforcement member is similar to that of the first locking member 36, the first stopper 226 and the first reinforcement member 228 so these disposition ways are not shown in figures.

The present invention further includes connection part 70 that is connected between the first fix member 30 and the second fix member 40. Thus the movement of the first fix member 30 as well as the second fix member 40 is more convenient due to the connection part 70 while assembling or disassembling the storage device 10. Thus the convenience of both assembly/disassembly of the storage device 10 is enhanced.

Figure 1A:
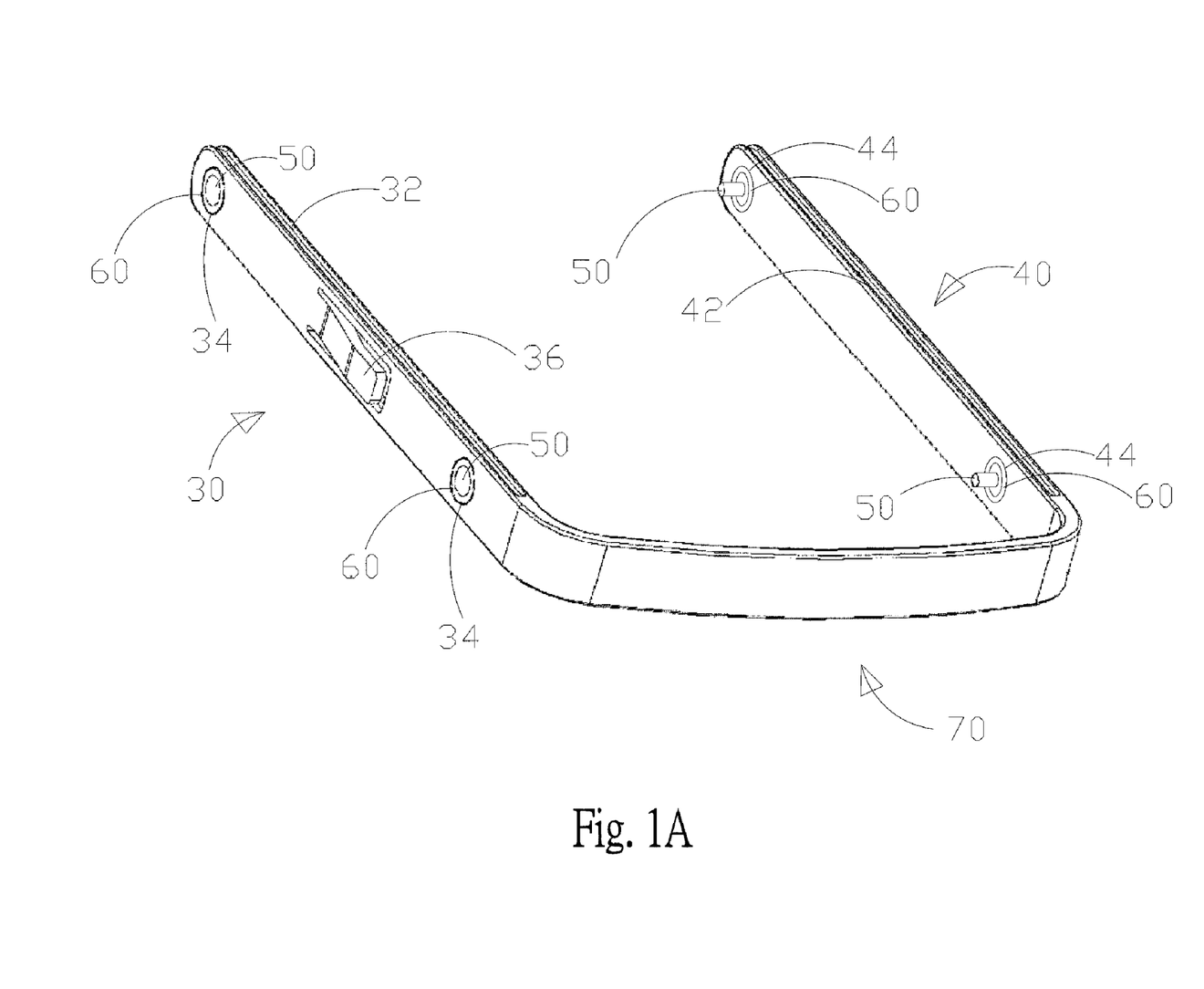
FIG. 1A is a perspective view of an embodiment of a fastener according to the present invention.
Figure 1B:
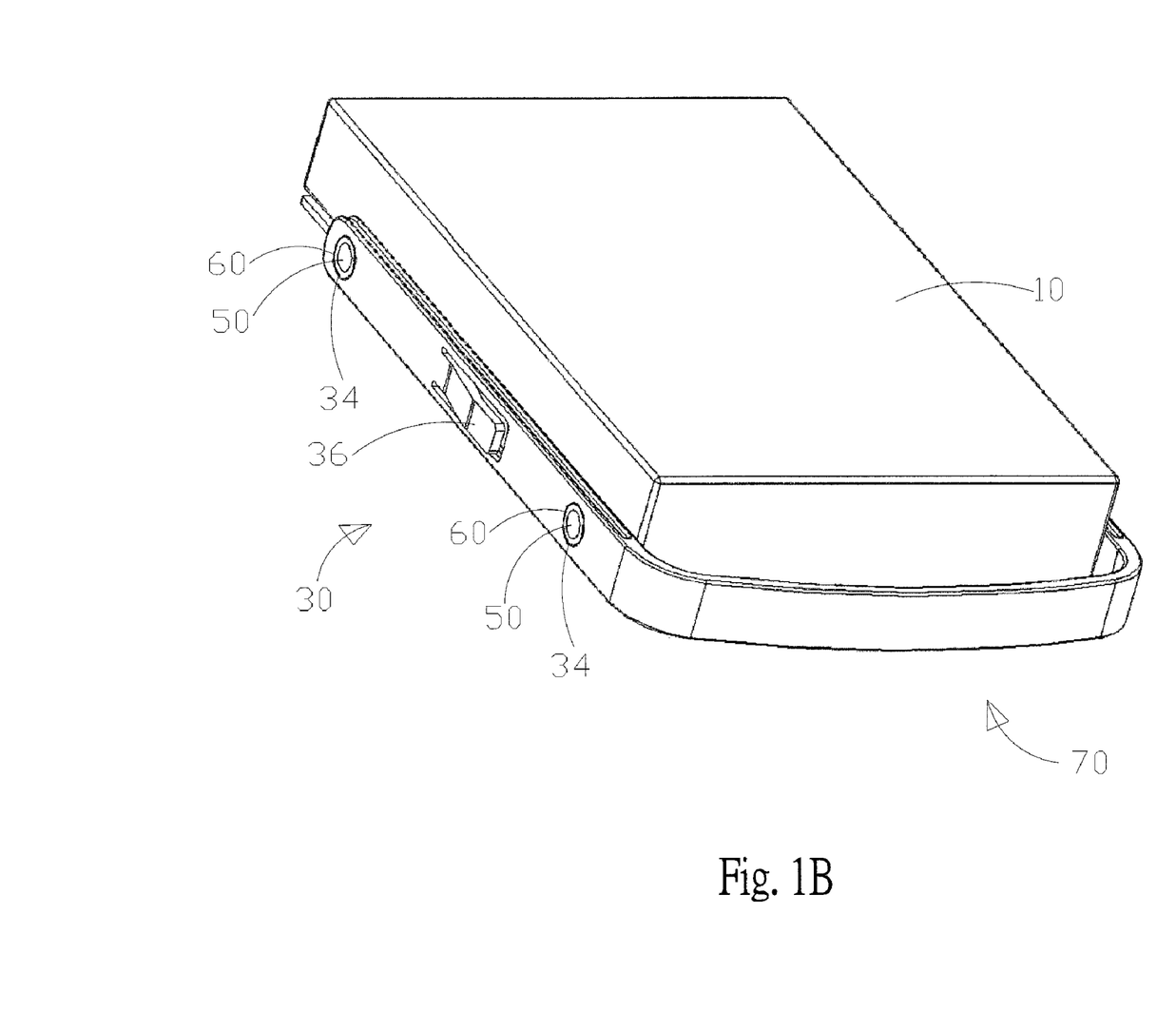
FIG. 1B is a schematic drawing showing the fastener assembled on a storage device according to the present invention.
Figure 2A:
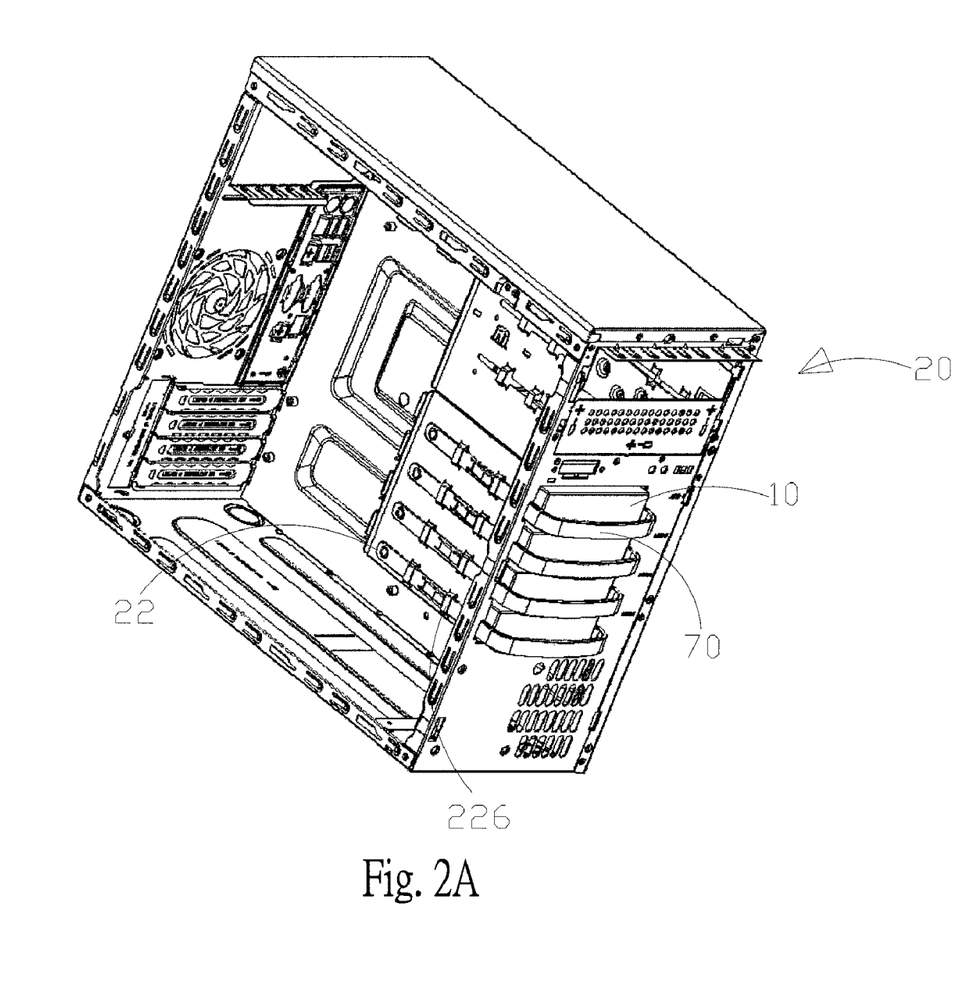
FIG. 2A is a perspective view showing an assembly of a computer housing with a storage device of an embodiment according to the present invention.
Figure 2B:
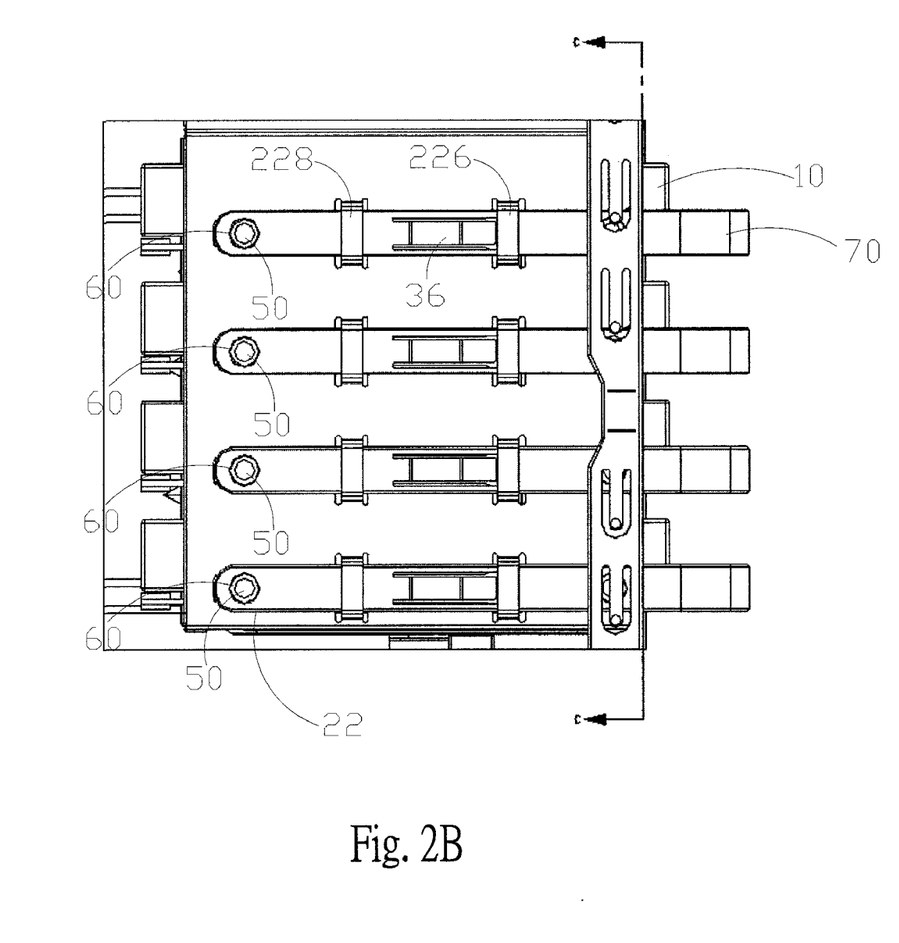
FIG. 2B is a schematic drawing showing slots assembled with fasteners of an embodiment according to the present invention.
Figure 2C:
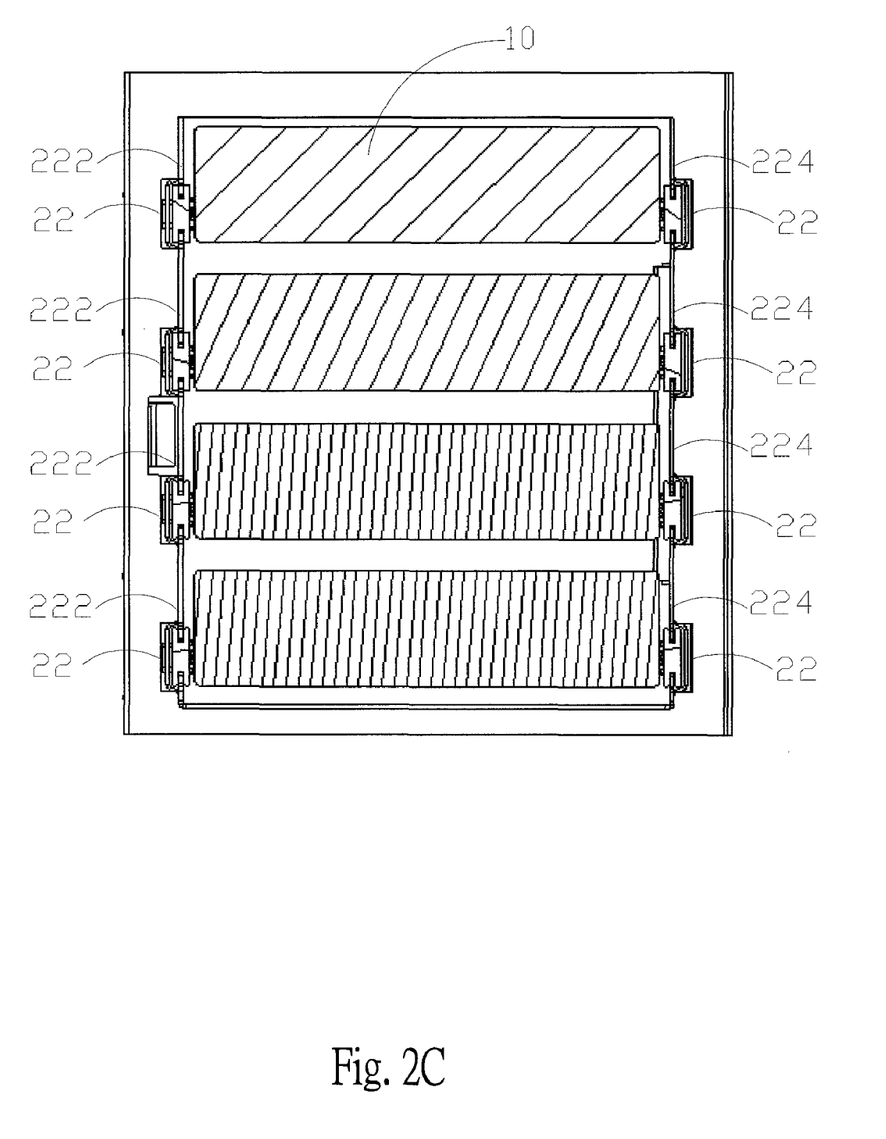
FIG. 2C is a cross sectional view along a c-c line of the embodiment in FIG. 2B.
Figure 3A:
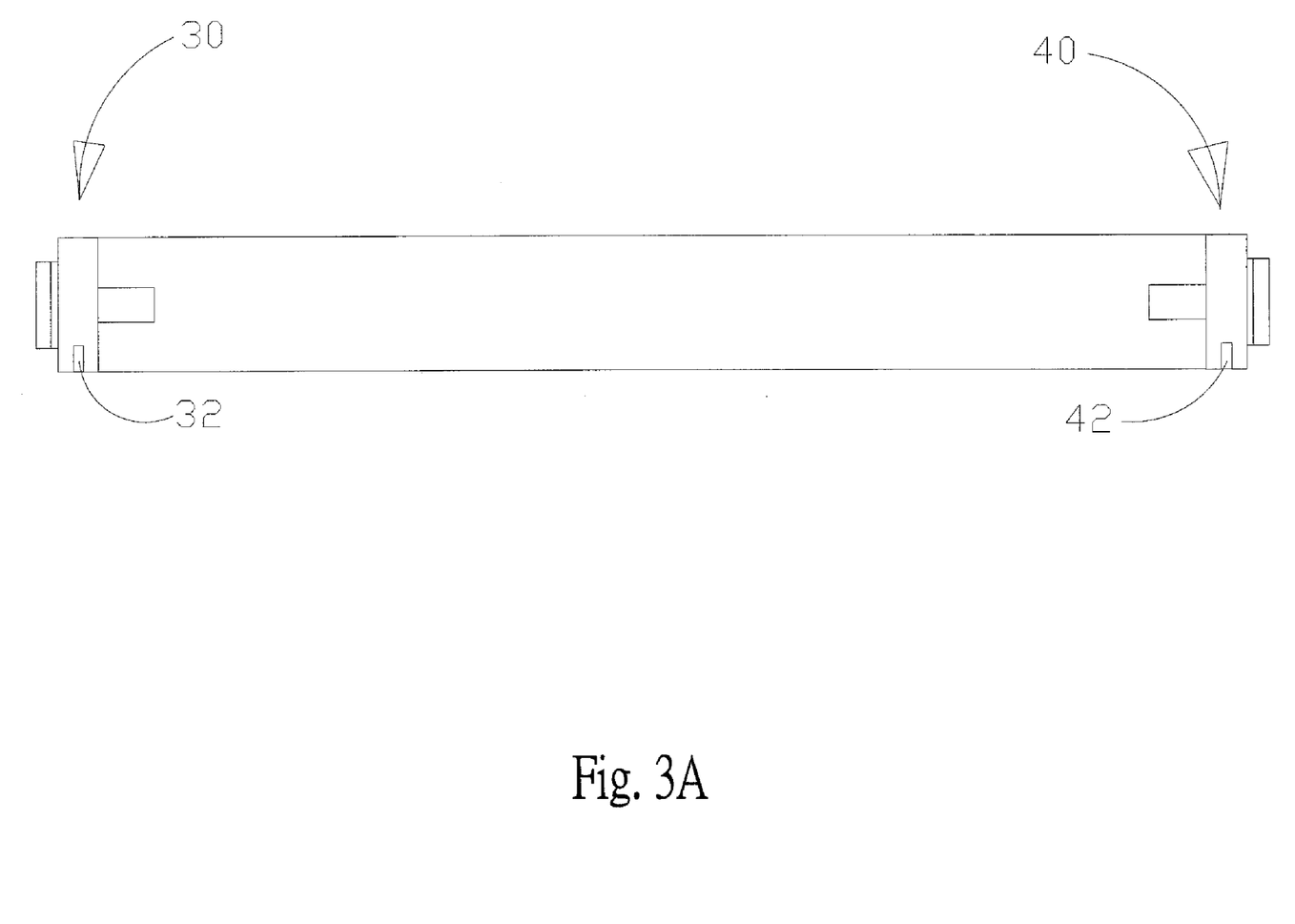
FIG. 3A is a schematic drawing showing positions of a first groove and a second groove of an embodiment according to the present invention.
Figure 3B:
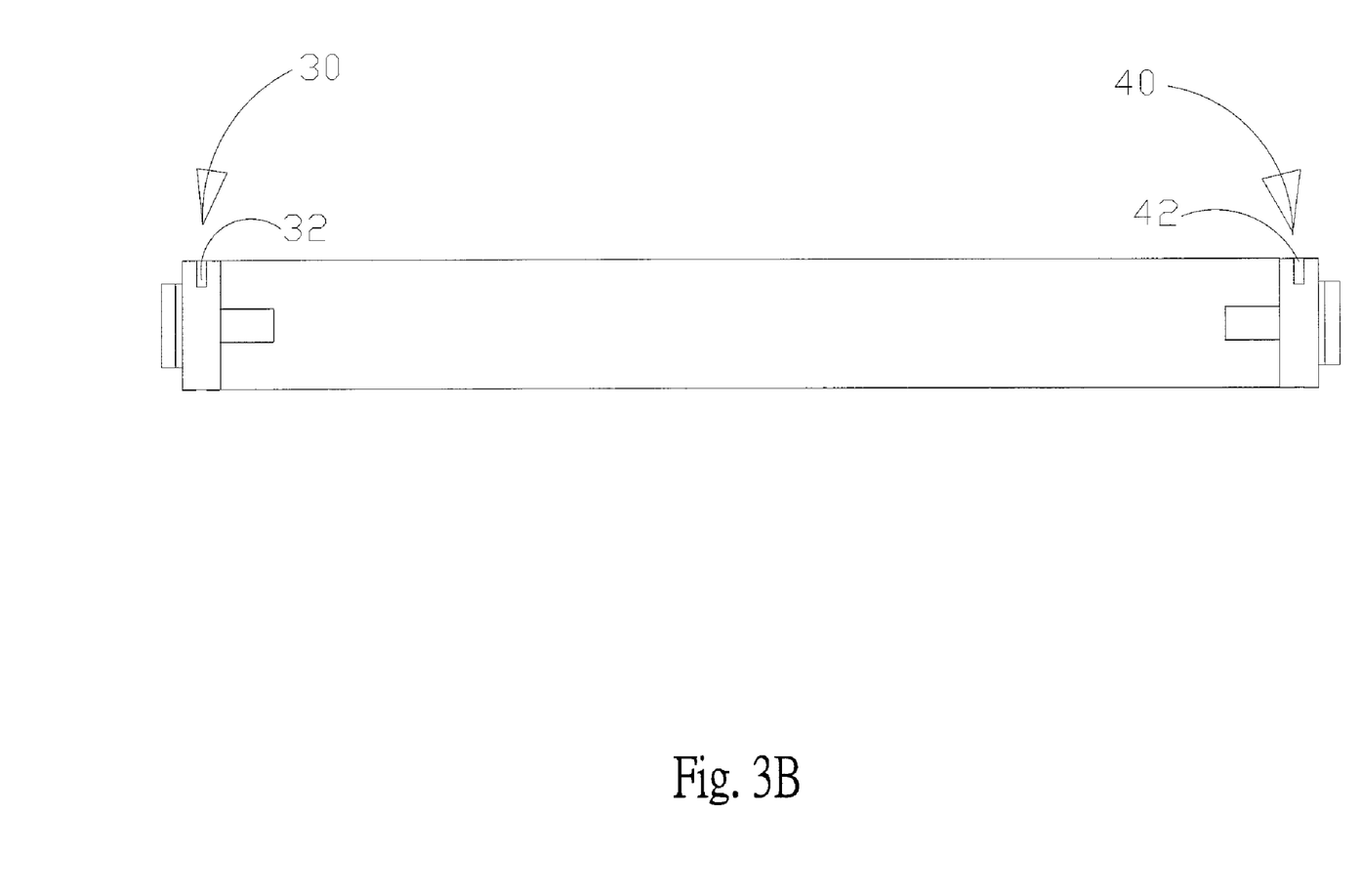
FIG. 3B is a schematic drawing showing positions of a first groove and a second groove of another embodiment according to the present invention.
Figure 3C:
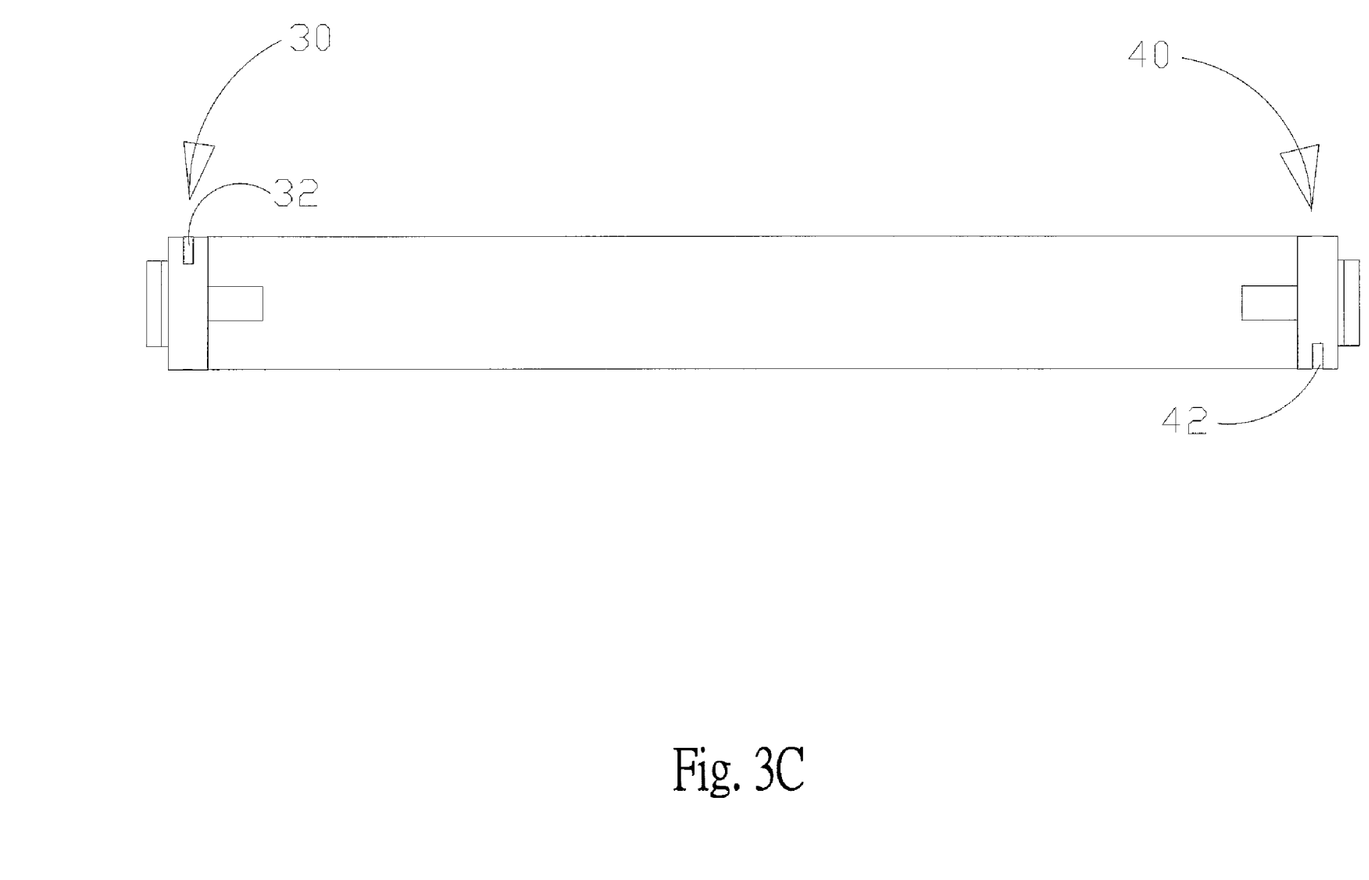
FIG. 3C is a schematic drawing showing positions of a first groove and a second groove of a further embodiment according to the present invention.
Figure 3D:
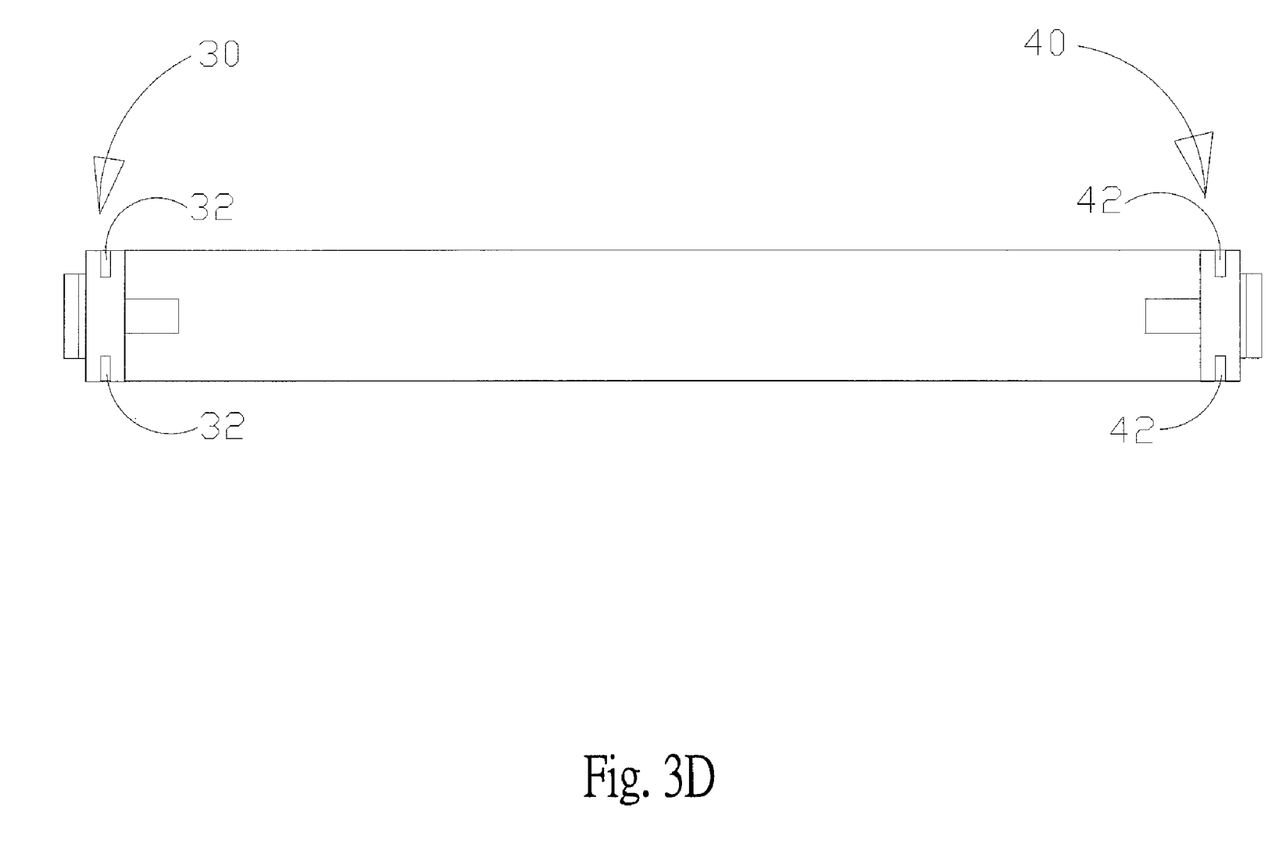
FIG. 3D is a schematic drawing showing positions of a first groove and a second groove of a further embodiment according to the present invention.

Refer from FIG. 3A to FIG. 3D, both are schematic drawings showing different arrangement of the first groove 32 and the second groove 42. As shown in figure, the first groove 32 is arranged above or under the first fix member 30 while the second groove 42 is disposed above or under the second fix member 40. As shown in FIG. 3A, the first groove 32 is arranged under the first fix member 30 and the second groove 42 is disposed under the second fix member 40. The first mount member 222 and the second mount member 224 beside the slot 22 are set under the outer side of the slot 22. Refer to FIG. 3B, the first groove and the second groove 42 respectively are arranged above the fix member 30 and the second fix member 40. Or as shown in FIG. 3C, the first groove 32 is arranged above the first fix member 30 and the second groove 42 is disposed under the second fix member 40. Refer to FIG. 3D, the first groove 32 is arranged above and under the first fix member 30 respectively and the second groove 42 is disposed above and under the second fix member 40 respectively.

In summary, a fastener for securing computer storage devices includes a first fix member, a second fix member and a connection part. The first fix member and the second fix member respectively are disposed on each of two sides of a storage device. The first fix member and the second fix member respectively are arranged with at least one first groove and at least one second groove. A first mount member and a second mount member of a housing respectively are assembled with the first groove and the second groove. The storage device is fixed by the first fix member and the second fix member. Moreover, the storage device is more stably fixed in the housing of computers by the assembly between first mount member and the second mount member with the first groove and the second groove.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A fastener for securing computer storage device disposed on a storage device of computers as well as on at least one slot of a housing of computers comprising:
   a first fix member arranged at one side of the storage device and disposed on one side of the slot; the first fix member is disposed with at least one first groove and a first mount member is disposed on one side of the slot while the first mount member is mounted in the first groove; and
   a second fix member arranged at the other side of the storage device and disposed on the other side of the slot; the second fix member is disposed with at least one second groove and a second mount member is disposed on the other side of the slot while the second mount member is mounted in the second groove.

2. The device as claimed in claim 1, wherein the first groove is arranged over the first fix member.

3. The device as claimed in claim 1, wherein the first groove is arranged under the first fix member.

4. The device as claimed in claim 1, wherein the second groove is arranged over the second fix member.

5. The device as claimed in claim 1, wherein the second groove is arranged under the second fix member.

6. The device as claimed in claim 1, wherein the first mount member is integrated with the housing.

7. The device as claimed in claim 1, wherein the second mount member is integrated with the housing.

8. The device as claimed in claim 1, wherein at least one first locking member is disposed on a side of the first fix member while at least one first stopper is arranged at the housing and located one side of the slot; the first locking member rests against the first stopper.

9. The device as claimed in claim 8, wherein the first stopper is integrated with the housing.

10. The device as claimed in claim 8, wherein the housing is disposed with at least one first reinforcement member that is located on one side of the slot.

11. The device as claimed in claim 10, wherein the first reinforcement member is integrated with the housing.

12. The device as claimed in claim 1, wherein at least one second locking member is disposed on a side of the second fix member while at least one second stopper is arranged at the housing and located the other side of the slot; the second locking member rests against the second stopper.

13. The device as claimed in claim 12, wherein the second stopper is integrated with the housing.

14. The device as claimed in claim 12, wherein the housing is disposed with at least one second reinforcement member that is located on the other side of the slot.

15. The device as claimed in claim 14, wherein the second reinforcement member is integrated with the housing.

16. The device as claimed in claim 1, wherein the first fix member and the second fix member respectively are disposed with a plurality of fix pins and the storage device is arranged with a plurality of fix holes while the fix pin is mounted in the fix hole.

17. The device as claimed in claim 16, wherein at least one buffer element is arranged between each fix pin and the first fix member as well as each fix pin and the second fix member.

18. The device as claimed in claim 17, wherein the first fix member and the second fix member respectively are disposed with a plurality of holes and the buffer element is introduced in the hole.

19. The device as claimed in claim 17, wherein the buffer element is made from rubber.

20. The device as claimed in claim 1, wherein the fastener includes a connection part that connects the first fix member with the second fix member.

21. The device as claimed in claim 1, wherein the storage device is a magnetic disk drive.

22. The device as claimed in claim 1, wherein the storage device is an optical disk drive.

* * * * *